United States Patent
Stoakley et al.

(10) Patent No.: US 7,249,326 B2
(45) Date of Patent: Jul. 24, 2007

(54) METHOD AND SYSTEM FOR REDUCING NOTIFICATION AREA CLUTTER

(75) Inventors: Richard W. Stoakley, Seattle, WA (US); James B. Kurtz, Bellevue, WA (US); Todd J. Green, Seattle, WA (US); Ramkumar Ramasubramanian, Redmond, WA (US); Chris J. Guzak, Kirkland, WA (US); James F. Springfield, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 09/825,717

(22) Filed: Apr. 4, 2001

(65) Prior Publication Data

US 2001/0035881 A1 Nov. 1, 2001

Related U.S. Application Data

(60) Provisional application No. 60/195,625, filed on Apr. 6, 2000.

(51) Int. Cl.
*G06F 3/00* (2006.01)
(52) U.S. Cl. ............... 715/779; 715/772; 715/811; 715/814
(58) Field of Classification Search ............... 345/764, 345/765, 778, 779, 781, 783, 772, 808, 771; 719/318; 715/772, 779, 811, 814
See application file for complete search history.

(56) References Cited

U.S. PATENT DOCUMENTS

| | | | | |
|---|---|---|---|---|
| 5,534,887 A | * | 7/1996 | Bates et al. | 345/802 |
| 5,617,526 A | * | 4/1997 | Oran et al. | 345/779 |
| 5,673,403 A | * | 9/1997 | Brown et al. | 345/744 |
| 5,757,371 A | * | 5/1998 | Oran et al. | 345/779 |
| 5,790,122 A | * | 8/1998 | Cecchini et al. | 715/854 |
| 5,852,440 A | * | 12/1998 | Grossman et al. | 345/811 |
| 6,211,858 B1 | * | 4/2001 | Moon et al. | 715/771 |
| 6,385,662 B1 | * | 5/2002 | Moon et al. | 719/318 |
| 6,542,163 B2 | * | 4/2003 | Gorbet et al. | 345/711 |
| 6,553,416 B1 | * | 4/2003 | Chari et al. | 709/224 |

* cited by examiner

*Primary Examiner*—Kristine Kincaid
*Assistant Examiner*—Ting Zhou
(74) *Attorney, Agent, or Firm*—Shook, Hardy & Bacon LLP (57) ABSTRACT

A method and system are provided for use in a computer system for organizing and displaying notification items associated with the system, applications or other components, within a notification area. The system monitors items that are placed in the notification, comparing the period of placement with a predetermined time threshold value, If the item has remained inactive for longer than the predetermined threshold period, the item is hidden from the notification area. Additionally, the system monitors the hidden items for changes in icon appearance and will unhide the item upon a change in appearance or specific selection by a user. New items and unhidden items are arranged in the order of the most recent addition to the notification area. The system also allows a user to customize the behavior associated with individual notification items.

13 Claims, 8 Drawing Sheets

METHOD AND SYSTEM FOR REDUCING NOTIFICATION AREA CLUTTER

CROSS-REFERENCE TO RELATED APPLICATIONS

This application claims the benefit of U.S. provisional application Ser. No. 60/195,625 filed Apr. 6, 2000.

TECHNICAL FIELD

The present invention relates generally to computer software and more particularly to a method and system for organizing, displaying and accessing application and system notifications in a computer system.

BACKGROUND OF THE INVENTION

Computer operating systems commonly incorporate a feature to communicate system and application prompt and status information to the user. A notification area is available on the user interface that provides a mechanism for such communications. Notification areas are typically a user interface representation of the status of system, application or program items. This representation provides user awareness of the communicated status and usually provides a method for users to access a higher level of detail on particular items. Typically, applications that are developed for an operating system have the ability to place items in the notification area and to interact with items so placed. The presence and changes in appearance, along with the positioning of these items, provide notification to the user. Thus, users can quickly become aware of and recognize newly delivered notifications.

Figure 6:
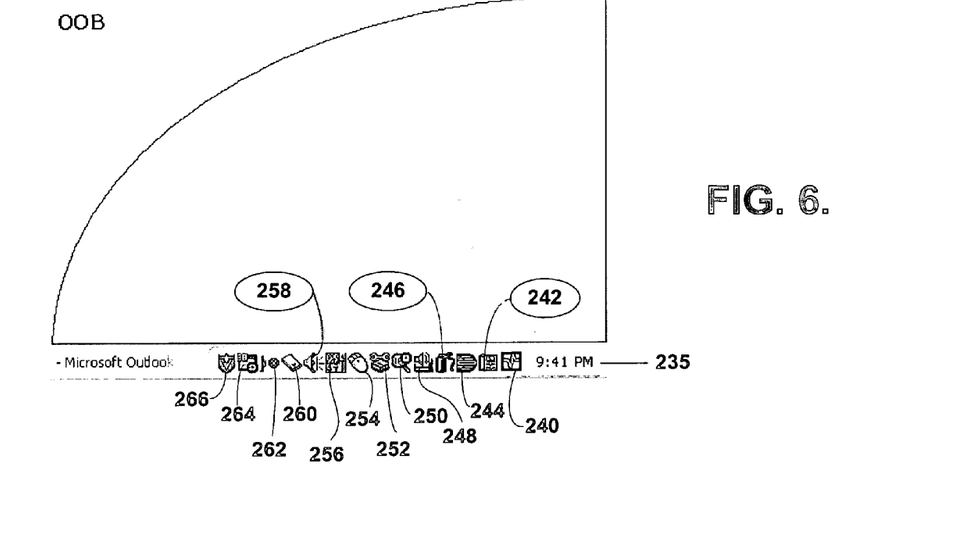
FIG. 6 is a partial view of an exemplary user interface illustrating a notification area to which the present invention will be applicable.

The notification area is populated as applications or the system request a user notification from the operating system. FIG. 6 illustrates a view of a notification area on a display produced in the "WINDOWS" operating system. As shown in FIG. 6, notification items are represented by icons 240-266, each associated with a particular notification. The notification area is typically located along the bottom of a computer display. A notification area typically displays an icon or some other representation that corresponds to the name of an application and/or a status. For instance, icon 266 located in the far left of the notification area represents a notification to the user that the virus protection program is currently running on the system and icon 260 indicates that a PCMCIA device is available on the system. As more notifications arise, the number of icons or symbols in the notification area increases. Since this area can be populated at will by applications, inactive items can be and are regularly placed in the notification area. This placement serves as a launch point into the application and as free advertising for the application. Therefore, while placement of the item in the notification area may be desirable for the application author, it may be undesirable for the user because it obscures the purpose of the notification area. Consequently, the numerous icons added and intended for divergent purposes obscure the original intention of the notification area, namely the delivery of meaningful user notifications, and prevent users from recognizing newly delivered notifications.

In the "WINDOWS" graphical operating system, as applications make system requests via the provided Shell_NotifyIcon Application Programming Interface ("API"), items can be added to the notification area. More items are added to the notification area as more applications make the request. These new items are placed to the right of the right-most item and make it difficult for a user who wishes to determine how or if the notification area has recently changed.

As previously mentioned, when multiple applications place icons in the notification area for non-intended purposes the user becomes unduly burdened with trying to determine which icons represent valid notifications. For example, an application could place an icon in the notification area merely as a way to display its icon in multiple locations on the user interface. Therefore, it can be seen that the notification area becomes cluttered with items that do not serve a notification function. This defeats the primary function of the notification area, namely to quickly and meaningfully notify the user.

Accordingly, there exists a need to better organize the notification area and to obscure undesirable items from the notification area. Moreover, there is a need for such a method and system to create more efficient, faster and consistent communication to the user via the user interface.

SUMMARY OF THE INVENTION

Generally described, a method is provided for use in a computer system for organizing and displaying notification items within a notification area. In accordance with the method, items that are placed in the notification area are monitored against a predetermined time threshold value. If the item has remained inactive for more than the predetermined threshold value, the item is hidden from the notification area. Additionally, the method monitors the hidden items for changes in appearance and will unhide the item upon a change in appearance. In one embodiment, new items and unhidden items are placed to the left of the most recent item in the notification area.

A method of hiding, revealing and selecting notification area items in a computer operating system having a graphical user interface is also provided. The graphical user interface includes a display and a user interface selection device. According to the method, the operating system will display hidden items and unhide a previously hidden item based upon a user selection or activity of the program or application associated with the hidden item. The user selected or system selected item is then placed and displayed in the notification area.

A method of selectively configuring the behavior of notification area items in a computer operating system having a graphical user interface is also provided. The graphical user interface includes a display and a user interface selection device. According to the method, the operating system will display a list of recent notification area items, a description of the item and an item behavior choice. The user may select from a list of options the desired behavior for each item in the list.

Additional advantages and novel features will be set forth in the description which follows, and in part may become apparent to those skilled in the art upon examination of the following, or may be learned by practice of the invention.

BRIEF DESCRIPTION OF THE SEVERAL VIEWS OF THE DRAWING

The present invention is described in detail below with references to the attached drawing figures, wherein.

DETAILED DESCRIPTION OF THE INVENTION

Figure 1:
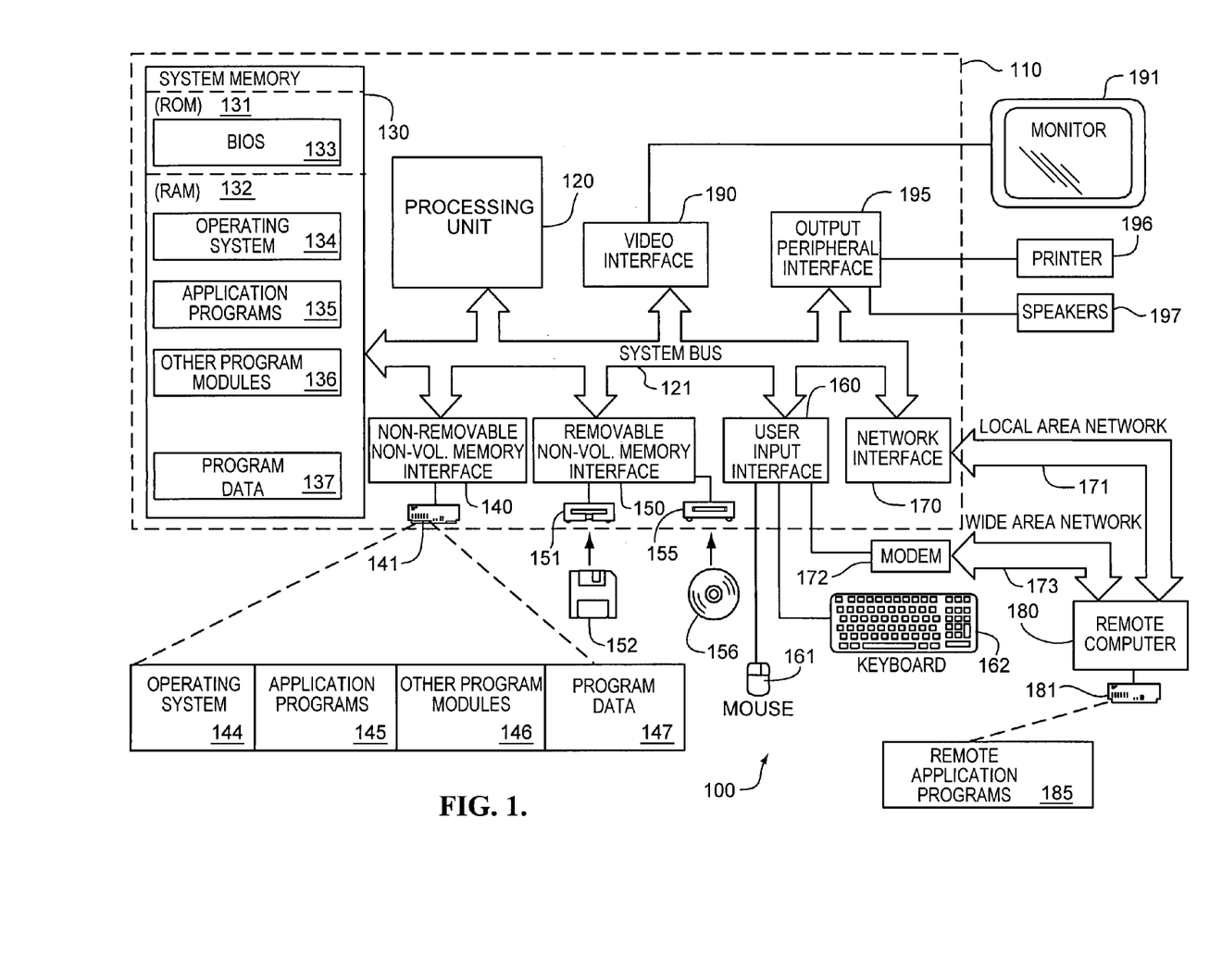
FIG. 1 is a block diagram of a computing system environment suitable for use in implementing the present invention.

The present invention provides a method and system for organizing and displaying notification items associated with the operating system, applications or other items within a provided notification area. FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an exemplary system for implementing the invention includes a general purpose computing device in the form of a computer 110. Components of computer 110 include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 141, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

The method and system of the present invention allow the notification area on a user interface to become more meaningful to the user of the computer. Although the method and system are described as being implemented in a "WINDOWS" graphical operating system by "MICROSOFT CORPORATION", one skilled in the art would recognize that the method and system can be used in any system supporting a graphical user interface that utilizes a notification area on the user interface that displays notification items.

As stated above, in the MICROSOFT CORPORATION WINDOWS operating system, the notification area is typically located along the bottom of the computer display. FIG. 6 illustrates a view of a notification area on a display produced in the "WINDOWS" graphical operating system. As show in FIG. 6, the notification area is located in the bottom right corner opposite the Start Button. Typically, the notification area is positioned so that it borders the edge of the taskbar that abuts the content area of the screen. It should be understood, however, that the position of the notification area is not of critical importance to the invention and that other locations for the notification area would also work.

As shown in FIG. 6, a notification item has an icon 240-266 associated with a particular notification type. As more notification requests are made, the number of corresponding notification area icons increase. As can be seen in FIG. 6, the notification area can become highly populated, which lessens the ability of the notification area to fulfill its notification function.

Figure 2:
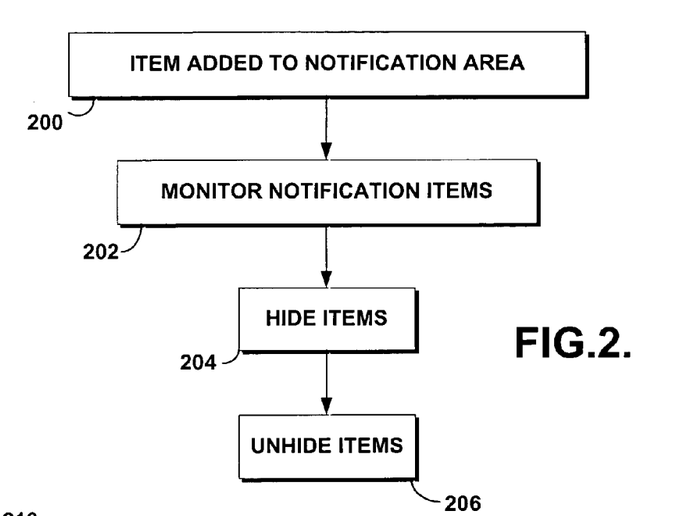
FIG. 2 is a flow diagram illustrating a preferred method to hide and unhide notification items.

As best seen in FIG. 2, the present invention involves a method for monitoring and hiding notification area items. At step 200, an application or program adds an item to the notification area. The application may be a word processor, database, email or any other type of system or end user application that may be run on a computer. Each application has the ability to invoke a request to add or remove an item to or from the notification area via the provided Shell_NotifyIcon "WINDOWS" API. As these requests are made, corresponding items are added to or removed from the notification area.

Returning to FIG. 2, the newly created notification items in the notification area are monitored for activity and the duration of their display in step 202. Upon reaching a predetermined threshold time limit of inactivity, the icon associated with the notification will be hidden. For example, all icons 240-266 that remain inactive for a set threshold time will be hidden in step 204. In this application, "hidden" is defined as removing individual icons 240266 from the visible component of the notification area and placing them behind the "chevron". As part of the monitoring step 202, the system will monitor the icon to determine if it has changed its appearance, such as a flashing icon. An icon 240-266 whose appearance is constantly changing will remain displayed because the start of the threshold time is reset with each change in appearance. A preferred methodology for monitoring the notification items of step 202 will be described in greater detail below. As seen in FIG. 2, in step 206 previously hidden notification items may be "unhidden" by returning the associated icon 240A-266A to the notification area. A number of predetermined conditions may exist which trigger the revealing of a previously hidden item. For example, when users select particular hidden icons or when the notification source changes the appearance of the icon or when balloon notifications are displayed, the icon is unhidden and displayed in the notification area.

Figure 3:
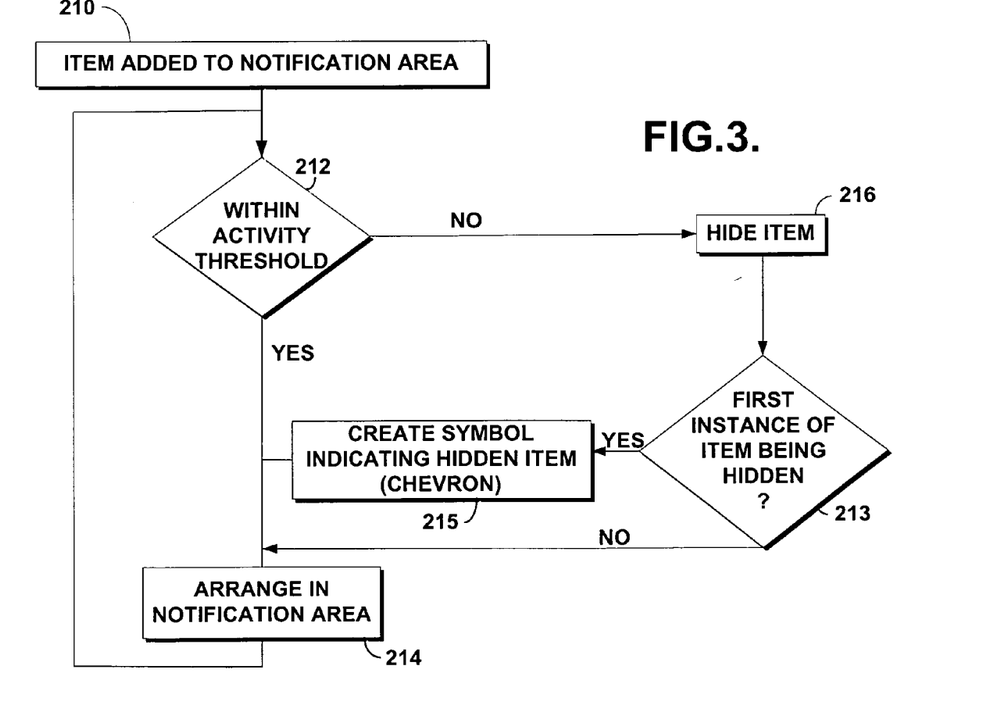
FIG. 3 is a flow diagram illustrating a preferred method for hiding notification items.
Figure 7:
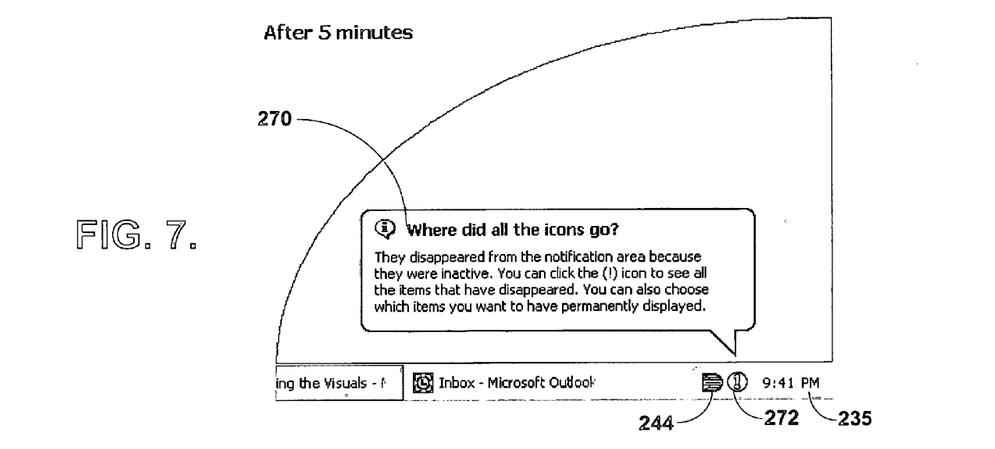
FIG. 7 is a view of a notification area utilizing the present invention and illustrating the hiding of notification items and a balloon notification display.

As stated above, the present invention involves monitoring notification area icons. FIG. 3 is a flow diagram illustrating a monitoring methodology involved in step 202 of FIG. 2. At step 210, an item is added to the notification area, similar to step 200 of FIG 2. After being added to the notification area, at step 212, the system monitors the item's activity to determine if the item has met the threshold time allowed for display. At the first occurrence of the threshold time limit, any items that have remained inactive for the entire threshold period are hidden, as indicated, at step 216. In this application, an item is defined as "inactive" if the associated icons have remained unchanged throughout the countdown period, have not been clicked on, nor have issued a balloon notification. Concurrent with the hiding of items, the notification area is rearranged at step 214 and a symbol is created that indicates to the user that an item has been hidden. At the first instance of an item being hidden, it is preferable to also include an explanatory communication indicating why the item was hidden, as well as, how it may be unhidden. For example, as best seen in FIG. 7, chevron icon 272 is created indicating an item has been hidden along with a balloon notification 270 explaining the hiding action and pointing to the chevron 272. The chevron 272 is only created if one does not already exist in the notification area as indicated in steps 213, 215 of FIG. 3.

In this application, a "chevron" 272 is defined as a place holder icon for the hidden items and which when clicked causes the hidden notification items to be displayed. The chevron 272 may be placed in the right-most location in the notification area, as illustrated in FIG. 7. While the examples given in this application involve placement of the chevron to the right-most position in the notification area, it should be understood that the invention is not in any way limited to any particular placement of the chevron. For example, but without limitation, the chevron 272 may be placed to the far left in the notification area. Moreover, the appearance of chevron 272 can take several forms, and is not limited to the appearance shown in the figures.

For example, when a system starts up, there may be several icons 240-266 displayed in the notification area, as illustrated in FIG. 6. There is an inactivity threshold time period associated with each of icons 240-266. This time period is started as soon as the notification items are visible for the first time. In the illustration of FIG. 6, only one icon 244 of all the displayed icons 240-266 is associated with an application that actively changes the icon's appearance during the threshold period. As earlier described, the countdown associated with icon 244 is therefore reset with each change of appearance. Consequently, the countdown never reaches the inactivity threshold limit of step 212. Icon 244 therefore remains visible and in step 214 gets arranged in the notification area. Other icons 240-242 and 246-266 which remained inactive for the threshold time period become hidden in step 216. FIG. 7 illustrates the resulting view of the notification area. Because this was the first instance of an item being hidden, the balloon notification 270 and chevron 272 are displayed as a result of the icons becoming hidden. Icon 244 remains visible and is displayed to the left of chevron 272 in the notification area.

Figure 8:
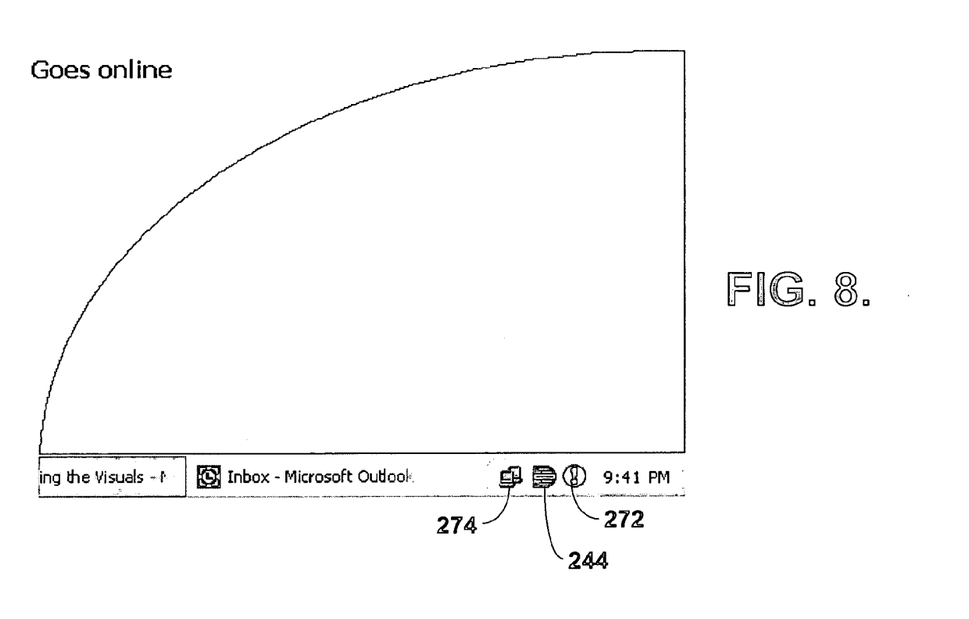
FIG. 8 is a view similar to FIG. 7, with a new notification area item added.

Continuing with an example of the method of FIG. 3 as seen in FIG. 8, when a new notification occurs, that is, when an application or the system has requested to place an item in the notification area, an icon 274 is added to the notification area. The previously hidden items remain hidden and represented by chevron 272.

Figure 9:
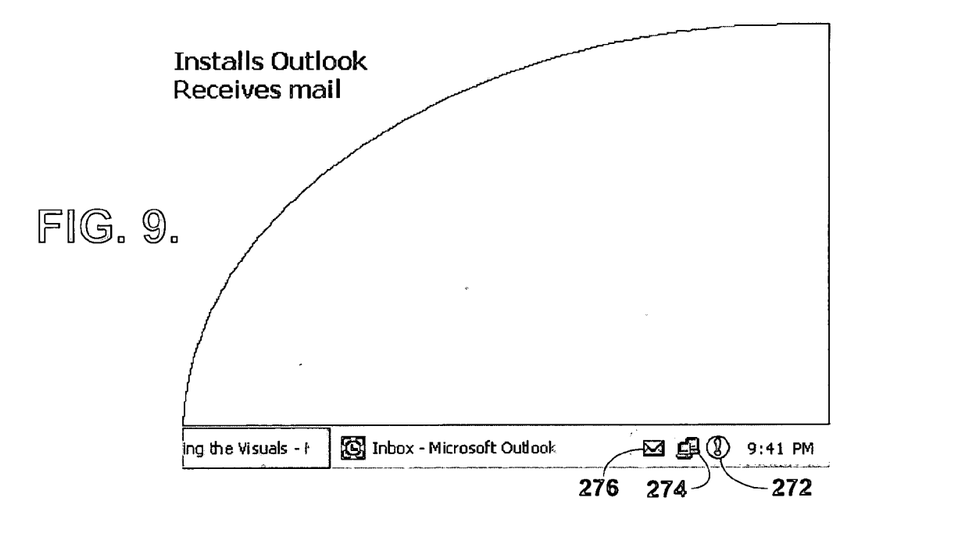
FIG. 9 is a view similar to FIG. 8, illustrating the positioning of new items in the notification area.
Figure 10:
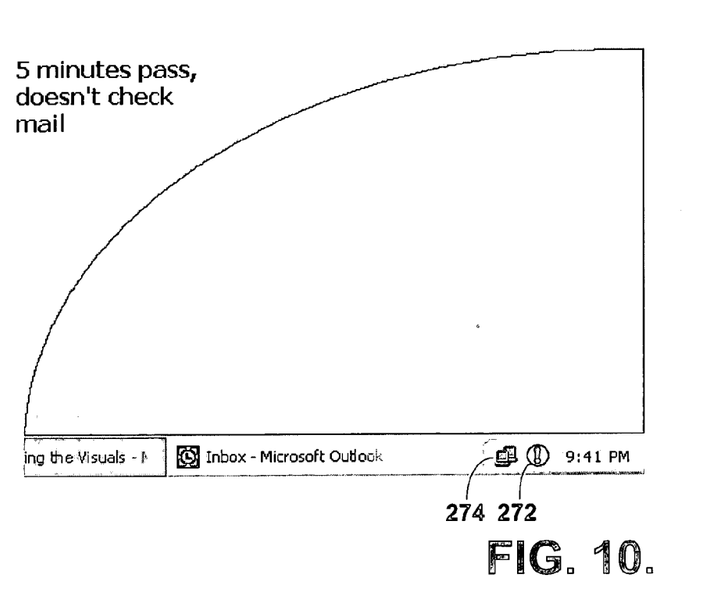
FIG. 10 is a view similar to FIG. 9, illustrating the effect of the passage of the threshold time limit on an inactive item.

Continuing with the above example, as time passes, the notification area may change to that shown in FIG. 9. During this passage of time, in this example, a previously active item associated with icon 244 has exceeded the threshold time limit. Also, a new notification associated with an icon 276 has occurred. Further, icon 274 has not reached the threshold time limit. Given these occurrences, icon 244 will be hidden, icon 276 is displayed and the notification area is rearranged accordingly as shown in FIG. 9. This arrangement may consist of placing icon 276 to the far left, followed by the previous icon 274 and then the chevron 272 in the notification area. If the newly added icon 276 has been inactive for a time period exceeding the threshold limit, icon 276 is hidden and the notification area is rearranged once again, as shown in FIG. 10.

Therefore, it can bee seen that the method illustrated in FIGS. 2 and 3 can reduce the number of icons within the notification area. This reduction allows the system to convert the notification area of FIG. 6 to the notification areas of FIGS. 7-10. In so doing, the items remaining within the notification area more properly serve a notification function.

Figure 12:
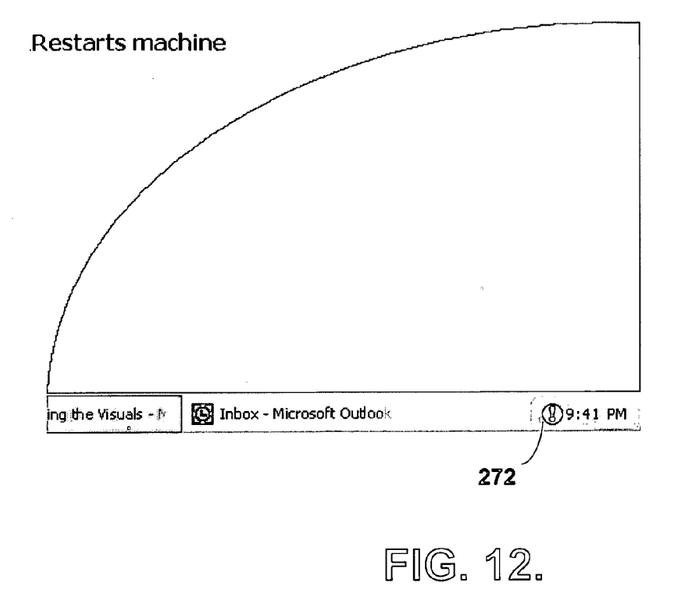
FIG. 12 is a view of similar to FIG. 11, illustrating the view of the notification area when the system is restarted.

Those skilled in the art will appreciate that the option to reduce notification area clutter may be altered by the user. The hiding of notification area items will typically occur when there are items that meet the threshold requirement of time and minimum number of items to hide. Alternatively, the user may configure items to "Always hide" or "Never Hide". As described above, if there are inactive items in the notification area, the system will hide those items and create a chevron in the notification area. Usually, at least two items must have met the criteria to hide items before either item is hidden, unless the behavior of an item is set to "Always Hide". In other words, it is not possible to have only one hidden icon whose behavior is set to "Hide When Inactive". Whenever an application inserts an item into the notification area, the system will hide that item if it was previously hidden, as illustrated in FIG. 12. This is especially useful for items that applications insert upon start up of the computer. Without the benefit of the present invention, when a system first starts up, there could be several icons 240-266 displayed in the notification area, as shown in FIG. 6. However, when the present invention hides icons, it also prevents those icons from being redisplayed at system start-up, resulting in an uncluttered notification area as shown in FIG. 12.

Figure 4:
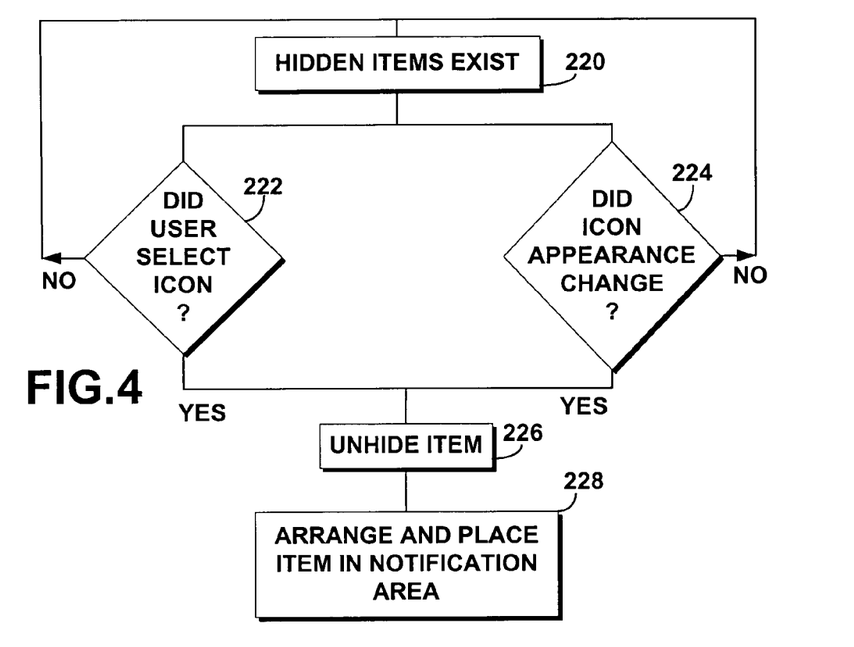
FIG. 4 is a flow diagram illustrating a preferred method to unhide notification items.
Figure 11:
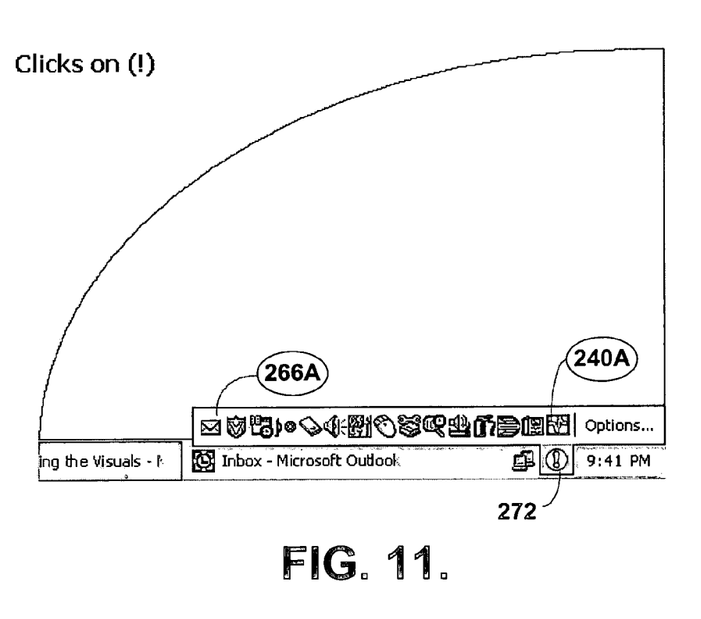
FIG. 11 is a view similar to FIG. 10, illustrating the view of hidden items upon the action of the user.

As stated above, the present invention also involves revealing previously hidden notification items. FIG. 4 is a flow diagram illustrating a revealing methodology for the present invention. At step 220, single or multiple items have been hidden by the system based on the monitoring and hiding methodology described above. A user can display the hidden items by clicking on chevron 272 as illustrated in FIG. 11. Upon activating the chevron 272, all of the hidden icons 240A-266A are displayed. At step 222, the system determines if a user has selected a particular hidden icon. if the user selects an icon, the system will unhide the icon at step 226. When an icon is unhidden, it is again displayed in the notification area. Unhidden icons are placed in the notification area and arranged at the left-most position thereof in step 228. Chevron 272 is removed from the notification area when there are no more hidden icons. Continuing with FIG. 4, at step 224, the system determines if the appearance of a hidden item has changed, in other words, whether the program associated with the item has reactivated a request for user notification. For example, if an icon displays a balloon notification, the icon is unhidden and the timer that monitors the activity of the icon is reset. In this case, as in the situation where a user selects an icon, the system will unhide the item at step 226 and display the item in the left most position in the notification area at step 228. if nothing has changed with regard to a hidden item, and if the user has not selected a hidden icon, the system takes no action but continues to monitor for unhide events.

Figure 5:
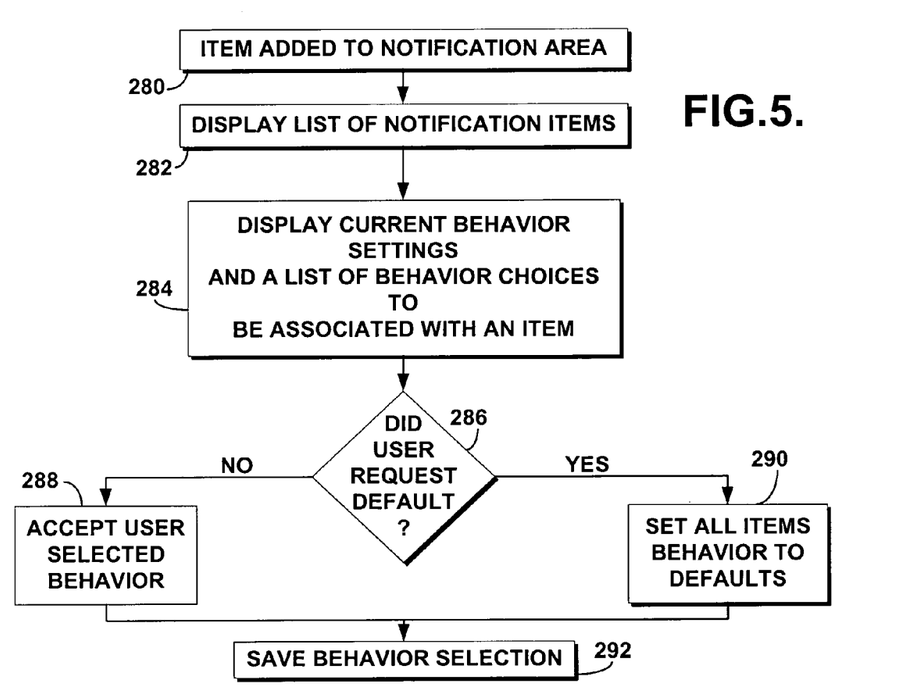
FIG. 5 is a flow diagram illustrating a preferred method to customize the behavior of notification items.
Figure 13:
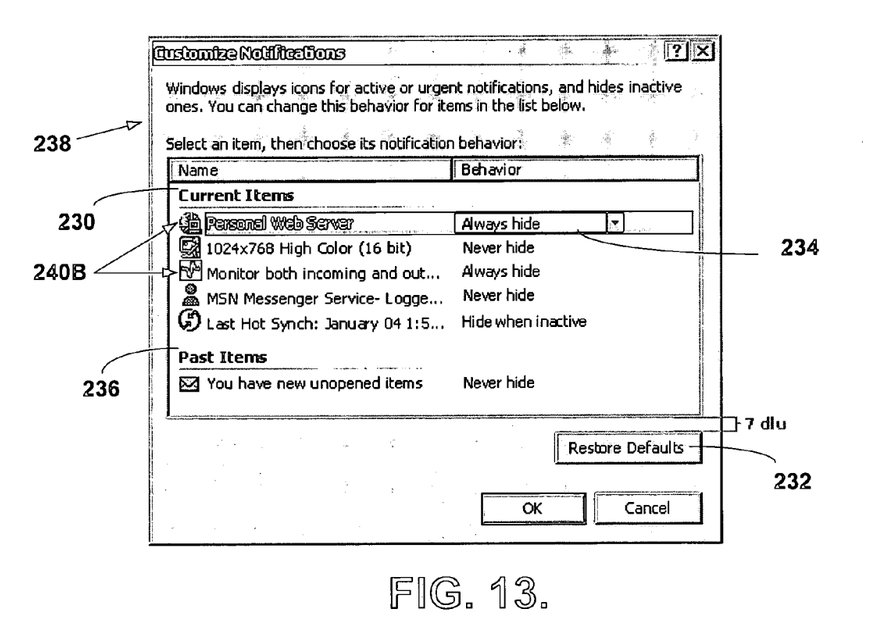
FIG. 13 is an exemplary user interface for customizing notifications in accordance with one embodiment of the present invention.

As best seen in FIG. 5, the system allows a user to specify items that are to remain always hidden and items that are never hidden. The methodology for configuring the system in this way is illustrated in FIG. 5. When an item is added to the notification area in step 280 of FIG. 5, as in steps 200 of FIG. 2 and step 210 of FIG. 3, that notification item and an associated behavior are added to a list in a customization dialog window 238 of FIG. 13. Continuing with FIGS. 5 and 13, at step 282, the dialog window 238 is displayed along with a listing of notification items 230. At step 284, a display of a choice of notification item behavior 234 is also displayed, as illustrated in FIG. 13. This dialog window 238 enables a user to configure how a particular notification item should be treated by the operating system. Each time the dialog window 238 is opened, the last saved behavior choice settings for current items 230 and past items 236 are displayed. At step 288, the user may select a choice of behavior from a menu 234 with options such as, 'Always Hide', 'Never Hide', 'Hide When Inactive' and so on. Alternatively, in step 286, the user may select to restore default settings by clicking a button 232 as seen in FIG. 13, in which case all behavior settings 234 are set to 'Hide When Inactive' or some other such predefined behavior choice in step 290. Thereafter, the behavior settings are saved at step 292.

As with the hiding methodology, the system may use one of several methods for determining the items to unhide. In one embodiment, items that are specifically selected from the hidden group of items by the user are unhidden. In another embodiment, items whose icons change in appearance while hidden become unhidden. In each case, the item that becomes unhidden is placed in the notification area as an icon in the left-most position in the order in which they were unhidden.

Alternative embodiments of the present invention will become apparent to those skilled in the art to which it pertains upon review of the specification, including the drawing figures. The various computer systems and components shown in FIGS. 1-13 and described in the specification are merely exemplary of those suitable for use in connection with the present invention. Accordingly, the scope of the present invention is defined by the appended claims rather than the foregoing description.

We claim:

1. A method in a computer system for organizing and displaying notification items associated with corresponding notification area icons on a display having a notification area, comprising:
   receiving one or more user inputs associating at least one of a plurality of user selectable hiding behaviors with at least a portion of said notification items, wherein at least one of said plurality of user selectable hiding behaviors includes an inactivity hiding behavior that hides the corresponding notification item icon when a preset threshold of inactivity with is met, and wherein at least one of said plurality of user selectable hiding behaviors displays the corresponding notification item icon without regard to said preset threshold of inactivity;
   monitoring an interval of time associated with an activity of at least a portion of the notification items;
   for each of at least a portion of the notification items associated with said inactivity hiding behavior, hiding the corresponding notification area icon from view after said preset threshold of inactivity with is met; and
   upon receipt of a user input indicating a desire to view the hidden notification area icons, redisplaying the hidden notification area icons in the notification area and repeating said monitoring and said hiding.

2. The method as recited in claim 1, further comprising: arranging the notification area items in the order in which the notifications occur.

3. The method as recited in claim 1, further comprising: determining the occurrence of activity on the monitored and hidden item; and
   revealing the item by redisplaying the item upon the occurrence of activity.

4. The method as recited in claim 1, further comprising: monitoring for the item most recently active; and
   revealing items in the order of the most recently active item.

5. A computer-readable medium having computer-executable instructions for performing the method recited in claim 1.

6. A computer system having a processor, a memory, and an operating environment, the computer system operable to execute the method recited in claim 1.

7. In a computer system having a graphical user interface including a display, a method of displaying and organizing notification item icons within a notification area, said method comprising:
   displaying each of the notification item icons in said notification area;
   providing a set of user selectable hiding behaviors to be associated with at least a portion of the notification item icons, wherein at least one of said set of user selectable hiding behaviors includes an inactivity hiding behavior that hides one or more of the notification item icons when a preset threshold of inactivity with is met;
   hiding one or more notification item icons associated with said inactivity hiding behavior upon meeting said preset threshold of inactivity;
   retrieving a chevron icon;
   displaying the chevron icon; and
   upon receipt of a user input indicating a desire to view the hidden notification area icons, repeating said displaying each of the notification item icons in the notification area, repeating said hiding after said preset threshold of inactivity is met and removing the chevron icon when there are no more hidden items.

8. The method as recited in claim 7, further comprising receiving a chevron entry selection signal indicative of a user selection of the chevron icon, and, in response to the chevron selection signal, displaying each of the hidden notification items on the display.

9. The method as recited in claim 8, wherein the unhide criteria is met when an entry selection signal indicative of a user selection of the notification item icon is selected by the user from the displayed, previously hidden icons.

10. The method as recited in claim 9, wherein the response to the selection displays the notification item icon in the notification area on the display.

11. The method as recited in claim 10, wherein said notification item icon is placed to the far left of the notification area.

12. A computer readable medium having computer executable instructions for performing the method recited in claim 7.

13. A computer system having a processor, a memory, and an operating environment, the computer system operable to execute the method recited in claim 7.

* * * * *